O. R. H. ZEITZ.
GRINDING MACHINE.
APPLICATION FILED SEPT. 24, 1912.
1,045,243.
Patented Nov. 26, 1912.
2 SHEETS—SHEET 2.
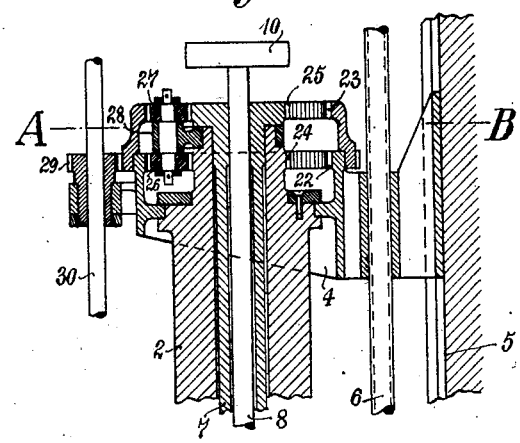
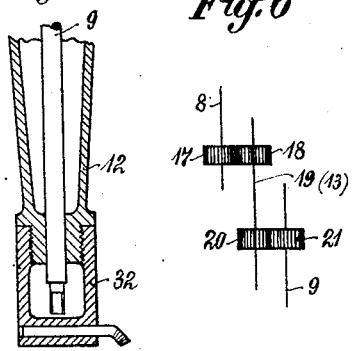
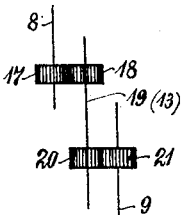
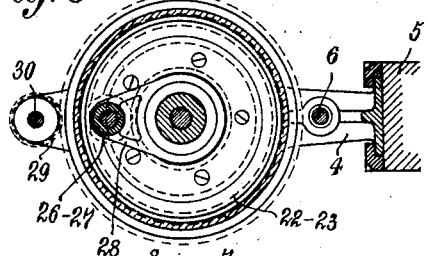
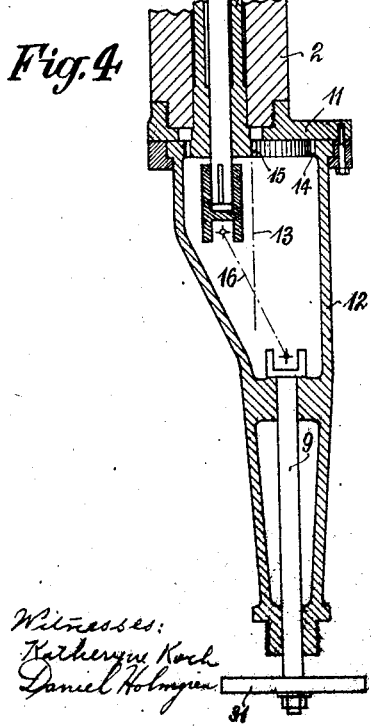
Witnesses:
Katheryne Koch
Daniel Holmgren
Inventor:
Otto Robert Hermann Zeitz
by his attorneys
Bieren & Jumpe

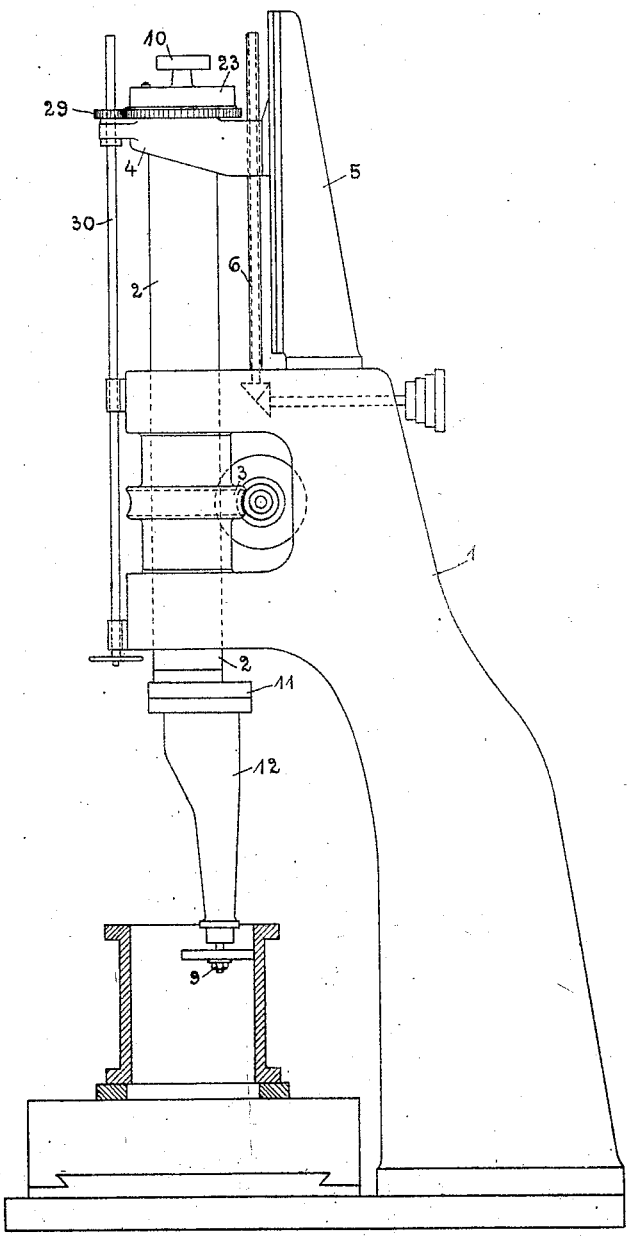

0
UNITED STATES PATENT OFFICE.

OTTO ROBERT HERMANN ZEITZ, OF KIEL, GERMANY.

GRINDING-MACHINE.

1,045,243.   Specification of Letters Patent.   Patented Nov. 26, 1912.

Application filed September 24, 1912. Serial No. 722,006.

*To all whom it may concern:*

Be it known that I, OTTO ROBERT HERMANN ZEITZ, engineer and director of the Kieler Maschinenbau - Aktiengesellschaft vorm. C. Daevel at Kiel, a subject of the German Emperor, and resident of Kirchhofsallee, Kiel, Germany, have invented certain new and useful Improvements in or Relating to Grinding-Machines, of which the following is a specification.

This invention relates to a grinding machine which can also be used for boring.

The invention consists in the particular shape of a device by means of which the diameter of the circle described by the tool, can be modified during working.

Figure 1 shows the device in side elevation, Fig. 2 is an enlarged vertical section through the carriage and coöperating parts; Fig. 3 a cross section on line A—B, Fig. 2; Fig. 4 a vertical section through the tool holder and coöperating parts; Fig. 5 a modification of the lower portion of Fig. 4, and Fig. 6 a modification of the transmission gear.

The spindle 2 is mounted in a rotatable and adjustable manner in a frame 1. The rotary movement of the spindle is obtained by means of a worm gear 3, or in some other suitable manner. The head of the spindle is rotatably mounted in a carriage 4 which can be reciprocated in the guide of the frame 5 or by means of the spindle 6, and thus brings about longitudinal movement of the spindle.

In the hollow spindle 2 is mounted a second hollow spindle 7 which forms the adjustment spindle for the tool holder, and in the said spindle 7 is again mounted a spindle 8 which drives the grinding spindle 9. The spindle 8 is driven by means of a pulley 10 or in any other manner.

The bottom end of the spindle 2 is provided with a retaining ring 11 in which the tool holder 12 is mounted so as to rotate about an axis 13 eccentrically relatively to the axis of the spindle 2. In the tool holder 12 is further mounted the grinding spindle 9 also eccentrically relatively to the axis of rotation 13 of the tool holder. The tool holder 12 is rotated by means of its toothed rim 14 with which engages a toothed wheel 15 of the adjustment or setting spindle 7. In that way the distance of the axis of the spindle 9 from the axis of the spindle 2, can be adjusted as required.

The movement of the spindle 8 is transmitted to the grinding spindle 9 by means of a spindle 16 with universal joints or, as shown in Fig. 6, by means of wheels 17—21.

In order to enable the distance between the axes of the spindles 9 and 2 to be modified during the working, the slide 4 is provided with a toothed rim 22, and a second toothed rim 23. Both of them have the same inner teeth, but it must be remembered that the toothed rim 23 can be turned relatively to the toothed rim 22 secured to the slide 4 in a non-rotatable manner. The spindle 2 and the setting spindle 7 have, on the other hand, the same outer teeth 24, or 25.

On the spindle 2 is rotatably mounted an arm 28 in which is secured a spindle with two end journals. On the said end journals are rotatably mounted two toothed wheels 26, 27, of equal size, so that, as shown in the drawing, they engage on the one hand with the toothed rims 22 and 23, and on the other hand with the toothed wheels 24 and 25. The wheel 23 is also provided with teeth outside with which engages a toothed wheel 29 rotated by a spindle 30 (Fig. 1).

As soon as the wheel 29 is moved, the toothed rims 22 and 23 are turned relatively to each other, and therefore also the spindle 7 is turned relatively to the spindle 2. In that way, the wheel 15 is also operated, and the head 12 rotated about the axis 13. When boring is to be done, the grinding disk 31 is removed, and the tool holder 32 placed on the head 12.

In order to get a clear idea of the peculiar movements, let it be imagined that the toothed rim 23 (as well as the toothed rim 22) is standing still. When the spindle 2 is rotated, the wheel 26 will also be rotated and roll on the toothed rim 22, whereby the arm 28 will be given a rotary movement about the axis of the spindle. The wheel 27 must then of course make the same movement as the wheel 26, as it is rolling on the toothed rim 23 of the same size. The consequence will be that the wheel 25 will rotate with the same angular speed and in the same direction as the wheel 24. As long therefore as the toothed rim 23 remains stationary, the spindle 7 will always rotate with the same speed as the spindle 2, and the toothed rim 14 will not be affected by the wheel 15. If however the toothed rim 23 is rotated, the spindle 7 will be of course moved relatively to the spindle 2, and therefore the tool holder will be shifted.

What I claim is:

1. In a machine of the character described, a hollow outer spindle, a concentric hollow inner adjusting spindle, a toothed wheel on the outer spindle, a like toothed wheel on the inner spindle, a fixed toothed rim and a rotatable toothed rim concentric respectively to said first and second toothed wheels, an arm rotatable around the spindles, pinions rotatable on the arm and connecting said toothed wheels with the respective toothed rims, and means for setting the rotatable rim whereby the adjusting spindle is shifted relatively to the outer spindle.

2. In a machine of the character described, a hollow outer spindle, a concentric hollow inner adjusting spindle, a toothed wheel on the outer spindle, a like toothed wheel on the inner spindle, a fixed toothed rim and a rotatable toothed rim concentric respectively to said first and second toothed wheels, an arm rotatable around the spindles, pinions rotatable on the arm and connecting said toothed wheels with the respective toothed rims, means for setting the rotatable rim, a toothed wheel on the adjusting spindle, an eccentric toothed ring engaged by said last named toothed wheel, and a tool holder depending from said ring.

3. In a machine of the character described, a hollow outer spindle, a concentric hollow inner adjusting spindle, a driving spindle encompassed thereby, a toothed wheel on the outer spindle, a like toothed wheel on the inner spindle, a fixed toothed rim and a rotatable toothed rim concentric respectively to said first and second toothed wheels, an arm rotatable around the spindles, pinions rotatable on the arm and connecting said toothed wheels with the respective toothed rims, means for setting the rotatable rim, a toothed wheel on the adjusting spindle, an eccentric toothed ring engaged by said last named toothed wheel, a tool holder depending from said ring, a grinding spindle carried by the tool holder, and means for operatively connecting the driving spindle to the grinding spindle.

In testimony whereof I have signed my name to this specification in the presence of two subscribing witnesses.

OTTO ROBERT HERMANN ZEITZ.

Witnesses:
  JULIUS ROPKE,
  CARL FREDRICK FRENKEL.